(12) United States Patent
Kumarahalli Srinivasmurthy et al.

(10) Patent No.: US 9,047,030 B2
(45) Date of Patent: Jun. 2, 2015

(54) CACHING NETWORK SERVICE RESOURCES

(75) Inventors: Venugopal Kumarahalli Srinivasmurthy, Bangalore (IN); Loren D Chapple, Vancouver, WA (US); Laurent Pizot, Camas, WA (US); Deepak Ramachandran, Bangalore (IN); Hitesh Amrutlal Bosamiya, Bangalore (IN); Anurag Goyal, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1126 days.

(21) Appl. No.: 12/770,110

(22) Filed: Apr. 29, 2010

(65) Prior Publication Data

US 2011/0267633 A1  Nov. 3, 2011

(51) Int. Cl.
*G06F 3/12* (2006.01)
*H04L 29/08* (2006.01)

(52) U.S. Cl.
CPC ............ *G06F 3/1267* (2013.01); *G06F 3/1212* (2013.01); *G06F 3/122* (2013.01); *G06F 3/1244* (2013.01); *G06F 3/1265* (2013.01); *G06F 3/1271* (2013.01); *G06F 3/1287* (2013.01); *G06F 2206/1512* (2013.01); *H04L 29/08729* (2013.01); *H04L 67/12* (2013.01)

(58) Field of Classification Search
USPC .................................................. 358/1.1–3.29
See application file for complete search history.

(56) References Cited

U.S. PATENT DOCUMENTS

| 7,075,670 | B1 | 7/2006 | Koga |
| 2003/0086098 | A1* | 5/2003 | Sesek et al. ................... 358/1.1 |
| 2004/0020389 | A1* | 2/2004 | Holmstead et al. ........... 101/484 |
| 2004/0252327 | A1* | 12/2004 | Kacker et al. ................ 358/1.15 |
| 2005/0094191 | A1 | 5/2005 | Vondran, Jr. et al. |
| 2007/0263260 | A1* | 11/2007 | Ohta ............................ 358/448 |
| 2008/0037062 | A1 | 2/2008 | Omino et al. |
| 2008/0117449 | A1* | 5/2008 | Lauridsen et al. ........... 358/1.15 |
| 2008/0198399 | A1 | 8/2008 | Jacques |
| 2008/0259392 | A1 | 10/2008 | Tokumoto |
| 2008/0270597 | A1* | 10/2008 | Tenenti ........................ 709/224 |
| 2009/0181613 | A1* | 7/2009 | Chen et al. ................... 455/3.06 |
| 2009/0185214 | A1* | 7/2009 | Bellert et al. ................ 358/1.15 |
| 2010/0229086 | A1* | 9/2010 | Howell et al. ................ 715/273 |

FOREIGN PATENT DOCUMENTS

JP  2001325081 A  11/2001

OTHER PUBLICATIONS

English Abstract of Jap Pub No. 2001/625081, Nov. 22, 2001, Sakakura Teruhiko et al., Print Data Cache System.*

* cited by examiner

*Primary Examiner* — Marcellus Augustin
(74) *Attorney, Agent, or Firm* — Hewlett-Packard Patent Department

(57) ABSTRACT

An application service includes a device interface manager, an acquisition manager, and a job manager. The device interface is configured to receive, from a device, a print instruction defining a context. The acquisition manager is configured to use the context to acquire context compatible content. The job manager is configured to communicate a reference to a print service for accessing cached context compatible print data for the print instruction if the context compatible print data is available in a cache, and to otherwise communicate to the print service, context compatible print data for context compatible content acquired by the acquisition manager.

20 Claims, 4 Drawing Sheets

CACHING NETWORK SERVICE RESOURCES

BACKGROUND

Peripheral devices such as printers can be configured to communicate directly with the internet. Thus, functions that would otherwise be provided by processing components of the device can now be provided by a network service. Various functions can be segregated into applications. Application requests from a device consume processing resource of the network service. For example, to fulfill an application request, the network service may acquire data from another network source, process that data into a desired format, and return the processed data to the device. When a multitude of devices make requests of a such an application, the processing resources can be strained, degrading the user experience by delaying when and how often an application can provide a function for a given device.

DRAWINGS

DETAILED DESCRIPTION

Figure 1:
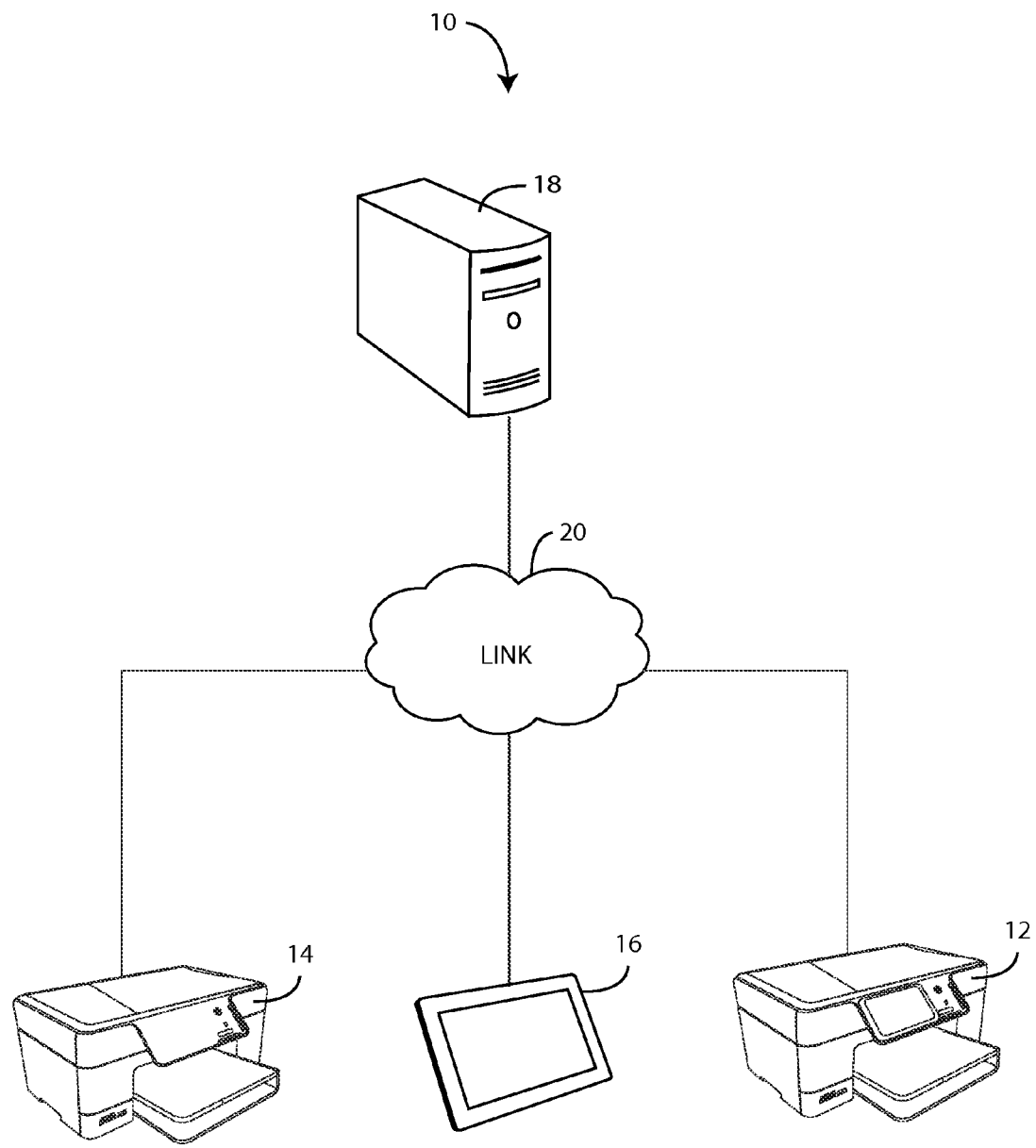
FIG. 1 depicts an exemplary environment in which various embodiments may be implemented.

INTRODUCTION: Various embodiments described below were developed in an effort to reduce the processing burden of a network resource providing print related functions for a fleet of printers. In particular, the network service can utilize a resource to fulfill a given print function. The first time a given function is performed in a given context, a context compatible resource is generated. Later, when the same function is to be performed under the same context, the network service can reuse the resource rather than generating it anew. The context can be discerned from device requests. The context discerned from a given request can be used to identify and reuse any number of context compatible resources for providing a requested print function or functions.

A "network service" refers to a server or collection of servers that are configured to communicate with a collection of devices to fulfill intended functions. Where those devices are printers, for example, those functions can include generating and delivering print jobs to the devices. Those functions can also include, as described in more detail below, projecting user interfaces to be displayed by those devices allowing users to interact with the network service.

"Context" refers to the conditions under which a request is made. Such conditions can be defined by the state of a device that made the request. That state can be represented by "state data." State data can identify capabilities of the device, a user's configuration of the device, and a current navigation state of a user's interaction. For example, where the device is a printer with a touch screen display, state data can identify the existence and the dimensions of the display, whether or not the printer can produce color output, consumable levels, and the availability of a particular print media such as photo paper. State data can identify a preferred language and other regional settings. State data can also define a position within an application workflow such as a current photo selected from a series of photos.

A "user interface" as used herein is a visual display through which a user can select from among one or more objects. An object, for example, can be a user selectable icon or a control button that is associated with the selection of an application or a particular function to be performed by a given application. A "user interface description" is an electronic file that when processed causes the display of a user interface defined by the description. The file, for example, may follow the XML (Extensible Markup Language) format. The file defines the user interface objects and their placement.

"Content" is used to refer to electronic data that can be formatted and rendered to generate a print job. "Print data" is used to refer to content formatted so that it can be rendered to generate a print job. Formatting, may for example, include assembling the content into a printable document. Such a document may that the form of a PDF (Portable Document Format). "Print job" is used to refer to print data that has been rendered into a format capable of being interpreted by a particular printer type to achieve a desired result. In other words, a print job is data configured to cause that printer device to produce printed output.

The term "resource" is used to refer to data generated and utilized by a network service in performance of a given function. A resource can be accessed using a network reference such as an URL (Uniform resource Locator). Once a resource is generated, its associated reference can be used to repeatedly access that resource. A reference for accessing a resource may be discerned from the context of a request received from a device. Resources can include, among others, user interface descriptions, acquired content, formatted content, and jobs rendered from formatted content. In a printing environment, the content is printable content, the formatted content is print data, and a rendered job is a print job. A resource may be context dependent and thus context compatible. In response to an initial request defining a given context, a corresponding resource may be generated or otherwise acquired. When a subsequent request defining the same context is received, that previously generated or acquired resource can be accessed using the context and reused to respond to the subsequent request.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

ENVIRONMENT: FIG. 1 depicts an exemplary network 10 in which various embodiments may be implemented. Network 10 is shown to include devices 12, 14, and 16, and network service 18. Devices 12-16 represent generally any electronic devices capable of communicating with network service 18 to request the performance of specified functions. Such functions can include the generation and delivery of jobs. In the example of FIG. 1, device 12 and 14 are printers capable of processing print jobs received from job service 18. Device 12 includes an integrated display, while device 14 does not. Device 16 is a display device that can serve as a display for device 14. Devices 12 and 14, however, need not be printers. Devices 12 and 14 may be of another device type capable of processing job to produce an output. That output may, but need not, be physical. For example, the output may be the display of a video or the archiving or transmission of an electronic file.

Network service 18 represents a network service configured to communicate jobs to devices 12 and 14. Where devices 12 and 14 are printers, those functions can include delivering print jobs to devices 12 and 14. The functions can also include projecting user interfaces to be displayed by devices 12 and 16. Projecting a user interface, as discussed below, involves communicating a description of the user interface to a device 12 or 16. The device 12 or 16 then processes that description to display the user interface. Through interactions with the user interface, a user can select an object or icon that represents a particular function to be performed. Where that function is to be performed by network service 18 (rather than device 12, 14, or 16), the device 12 or 16 sends a request informing network service 18 of the user's selection. Network service 18 responds to the request and performs the specified function.

Components 12-18 are interconnected via link 20. Link 20 represents generally one or more of a cable, wireless, fiber optic, or remote connections via a telecommunication link, an infrared link, a radio frequency link, or any other connectors or systems that provide electronic communication. Link 20 may include, at least in part, an intranet, the Internet, or a combination of both. Link 20 may also include intermediate proxies, routers, switches, load balancers, and the like. The paths followed by link 20 between components 12-18 as depicted in FIG. 1 represent the logical communication paths between these devices, not necessarily the physical paths between the devices.

Figure 2:
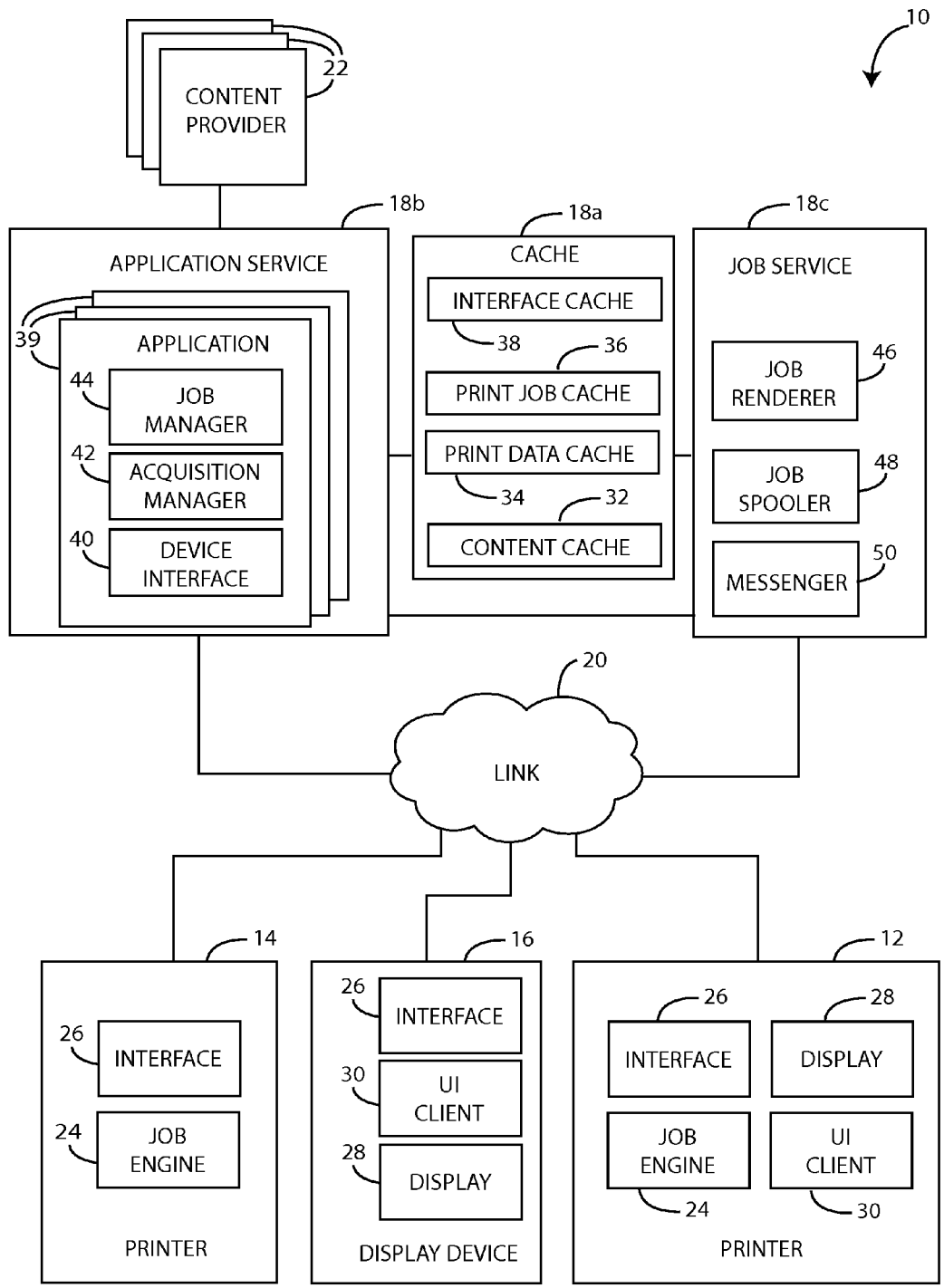
FIG. 2 depicts various physical and logical components for implementing various embodiments.

COMPONENTS: FIG. 2 depicts various physical and logical components for implementing various exemplary embodiments. In FIG. 2, network service 18 includes cache 18a, application service 18b, and job service 18c. Application service 18b and job service 18c generate and utilize resources in performances of their respective functions. Cache 18a represents one or more tangible electronic data repositories for storing those resources allowing them to be accessed and reused. Job service 18c represents a network service configured to cause devices to produce jobs. To do so, job service 18c may communicate jobs to devices 12 and 14. Application service 18b represents a network service configured to communicate with devices 12-16 to perform specified functions such as causing job service 18c to communicate jobs. Here, devices 12 and 14 are printers, so the jobs are print jobs.

FIG. 2 also depicts application service 18a being in communication with content providers 22. Content providers 22 each represent a network source such as a web site from which content can be retrieved. Application service 18 formats that content while job service renders the formatted content to generate print jobs to be delivered to printers 12 and 14.

Printer 12 is shown to include job engine 24, interface 26, display 28, and UI (User Interface) client 30. Printer 14 is shown to include job engine 24 and interface 28, while display device 16 is shown to include display 26, interface 28 and UI client 30. Job engine 24 represents generally any combination of hardware and programming configured to process a print job received from job service 20 to produce printed output. In a given example, job engine 28 includes components to deposit imaging material such as ink or toner onto a media sheet.

Interface 26 represents generally any combination of hardware and programming configured to receive communications from and pass communications to application service 18 and job service 20 via link 20. In particular, interface 28 may include one or more physical ports such as a wired or wireless network port via which communications may be sent and received on more than one data channel.

Display 28 represents generally any display screen on which a user interface can be displayed. Display 28 may be a touch screen allowing a user to select a user interface object by touching a particular screen location. Display may not include touch capabilities, but instead have associated physical buttons that when depressed or otherwise activated correspond to the selection of user interface objects. In one example, a user interface object may be positioned adjacent to such a button. In another example, one button may be used to highlight a user interface object while another may be used to select a highlighted object.

UI client 30 represents generally any combination of hardware and programming configured to process a user interface description to cause the display of a user interface on display 28. UI client 30 is also responsible for detecting the selection of a user interface object, and communicating a corresponding request to application service 18b using interface 26.

Cache 18a is shown to include content cache 32, print data cache 34, print job cache 36, and interface cache 38. In general, each cache 32-38 is configured to contain cached resources generated by application service 18b and job service 18c. Content cache 32 contains content acquired by acquisition manager 42. Print data cache contains print data formatted by job manager 44 from content acquired by acquisition manager 42. Print job cache 36 is configured to contain print jobs rendered by job renderer 46. Interface cache 38 is configured to contain user interface descriptions generated by device interface 40.

Application service 18 is shown to include applications 39. Each application 39 represents generally a combination of programming and hardware configured to perform a function at the request of printer 12 or 14. Such functions may include causing a print job to be delivered from job service 18c. In the example of FIG. 2, each application 39 includes device interface 40, acquisition manager 42, and job manager 44. Device interface 40 represents generally any combination of hardware and programming configured to receive, from devices 12 and 16, print instructions defining a context. A print instruction is a request that print jobs be communicated back in response.

As noted, the defined context identifies the conditions under which a request is made by or on behalf of given printer 12-14. Such conditions can be defined by the state of that printer 12-14 or display device 16. State data included in a request can identify capabilities of device 12-16, a user's configuration of device 12-16, and a current navigation state of a user's interaction with application 31. In particular, the current navigational state may identify the content that is to be used to generate a print job. For example, the navigational state may define a position within an application workflow such as a photo selected from a series of photos or a particular news category.

Responding to a request, device interface 40 may return a user interface description based on the context defined by the request. In doing so, device interface 40 retrieves the user interface description from interface cache 38 if available. If not available, device interface 40 generates the user interface description based on the context and updates interface cache 40 accordingly. Thus, upon receipt of a subsequent request defining the same context, device interface 40 can use that context to retrieve and return the cached user interface description. A user interface description generated or retrieved based on a context defined by a request is referred to as a context compatible user interface description.

The following is an example of a request defining a context. In this example, the request is represented by a reference containing state data defining the context.

http://app.hp.com/app/News/$lang/en/category/football/$touch/true.

The portion "app.hp.com/app/News/" is an address for accessing a particular application 39 of application service 18b. That application 39 corresponds to the portion "appname". Portions "$lang", "category", and "$touch" are parameter IDs. State data for each parameter ID has been inserted. In particular, "en" has been inserted to indicate English as a user preferred or regional language. "Football" has been inserted to indicate a category or navigation state within a workflow. "True" has been entered to specify that a requesting device does have touch screen device capabilities. Thus a context compatible user interface description would be in English and compatible with a touch screen display. It would further correspond to the position in an application workflow corresponding to "Football."

Acquisition manager 34 represents generally any combination of hardware and programming configured to acquire content based on the context defined by a request received by device interface 32. In doing so, acquisition manager 42 retrieves context compatible content from content cache 32 if available. If not available, acquisition manager 42 requests and retrieves the content from a given content provider 22 identified by the context and updates content cache 32 accordingly. Thus, upon receipt of a subsequent request defining the same context, acquisition manager 42 can use that context to retrieve the context compatible content from content cache 32. Content acquired from a content provider based on a given context of retrieved from content cache 32 using that context can be referred to as context compatible content.

Job manager 44 represents generally any combination of hardware and programming configured to format content acquired by acquisition manager 42 into print data according to the context defined by a request received by device interface 40. The content is formatted for delivery to job service 18c. Print data, for example, may take the form of a PDF (Portable Document Format) document. The document may be assembled based on the context to be compatible in size with print media available to device 12 or 14. Once the print data is assembled or otherwise generated, job manager 44 updates print data cache 34 accordingly so that the print data can be reused for a subsequent request defining the same context.

Following a receipt of a request by device interface 40, job manager 44 first determines if context compatible print data is available in print data cache 34. If available, acquisition manager 42 is not called on to acquire context compatible content. Instead, job manager 44 communicates a reference to job service 18c. Job service 18c can use the reference to retrieve the cached context compatible print data from print data cache 34. Otherwise, the content is acquired and print data generated from that content is communicated to job service 18c as noted above.

A reference for accessing a resource from cache may be discerned from the request received by device interface 40. For example, when caching the print data, job manager 44 may associate the cached resource with a reference defining the same context defined by the request. In the example above, the request included an address plus state data. That address corresponded to a given application 39. The state data defined the context. The reference for accessing the print data from the cache may be a reference having an address for accessing print data cache 34 plus data defining the context. Continuing with the above example, the following is an exemplary reference:

printdatacache.hp.com/app/News/$lang/en/category/football/$touch/true.

The portion "printdatacache.hp.com" represents the address for print data cache 34 while the remaining portions identify application 39 and the corresponding context for distinguishing the context compatible print data within print data cache 34.

Job service 18c, in the example of FIG. 2, includes job renderer 46, job spooler 48, and messenger 50. Job renderer 46 represents generally any combination of hardware and programming configured to render print data to generate a print job according to a context defined by a request received by device interface 40. Exemplary print job formats include Post Script and PCL(Printer Control Language). Once a print job is generated, job renderer updates print job cache to include that print job for reuse.

Job renderer 46 may receive the print data to be rendered or a reference for retrieving the print data from print data cache 34. As noted, the reference defines a context. Before retrieving print data using a reference, job renderer 46 may first determine if a print job associated with that context is available in print job cache 36. If so, job renderer retrieves that context compatible print job. Otherwise, job renderer 46 retrieves the print data using the reference and renders the retrieved print data to generate the context compatible print job.

Job Spooler 48 represents generally any combination of hardware and programming configured to act as a queue for print jobs generated or retrieved by job renderer 46. Messenger 50 represents generally any combination of hardware and programming configured to communicate print jobs from job spooler 48 to printers 12 and 14. In doing so, messenger may notify a given printer 12 or 14 that a print job is ready and then a deliver the print job when requested. Alternatively, messenger 50 may push print jobs to printers 12 and 14.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 3:
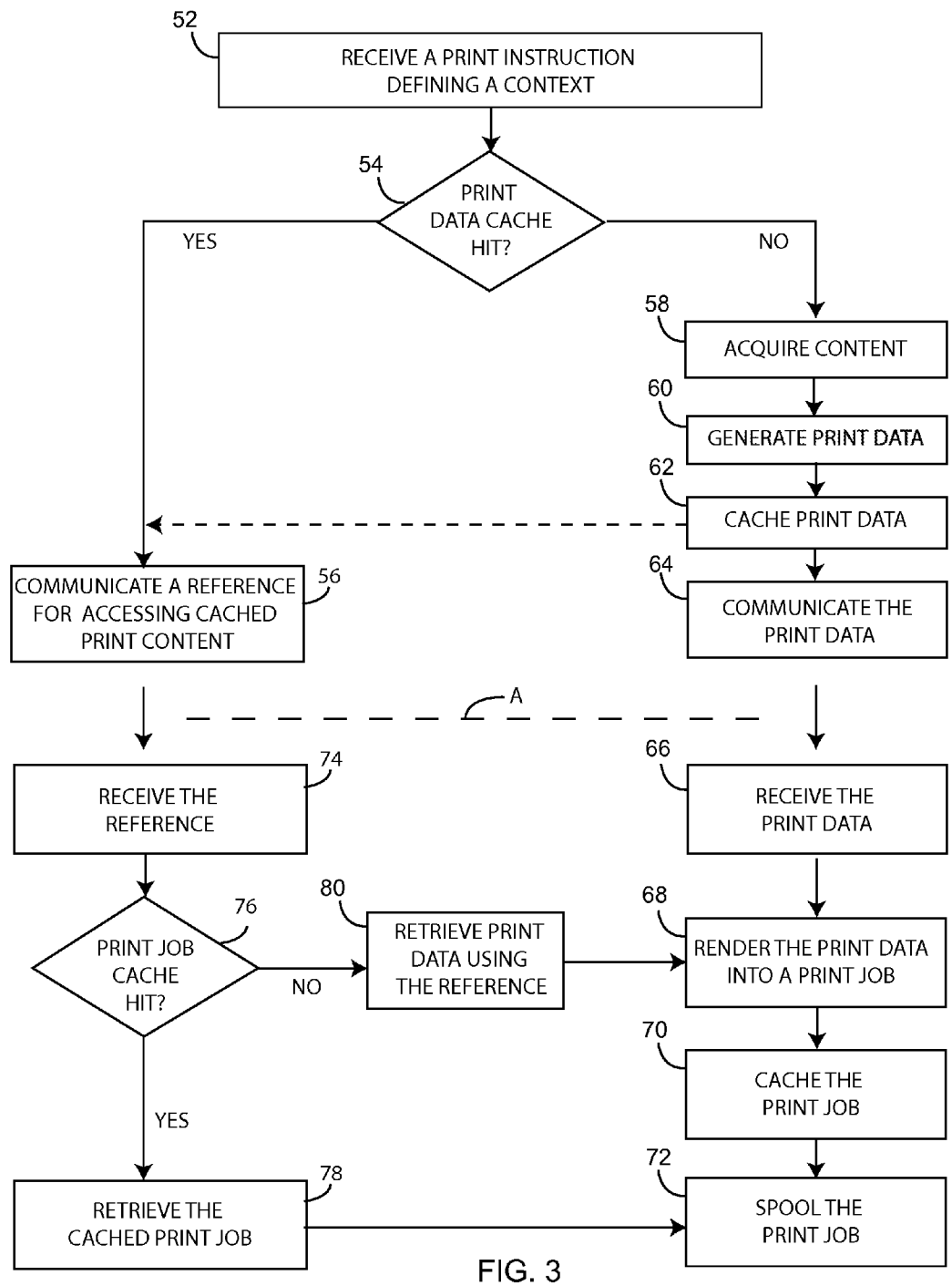
FIGS. 3-4 are exemplary flow diagrams depicting steps taken to implement various embodiments.
Figure 4:
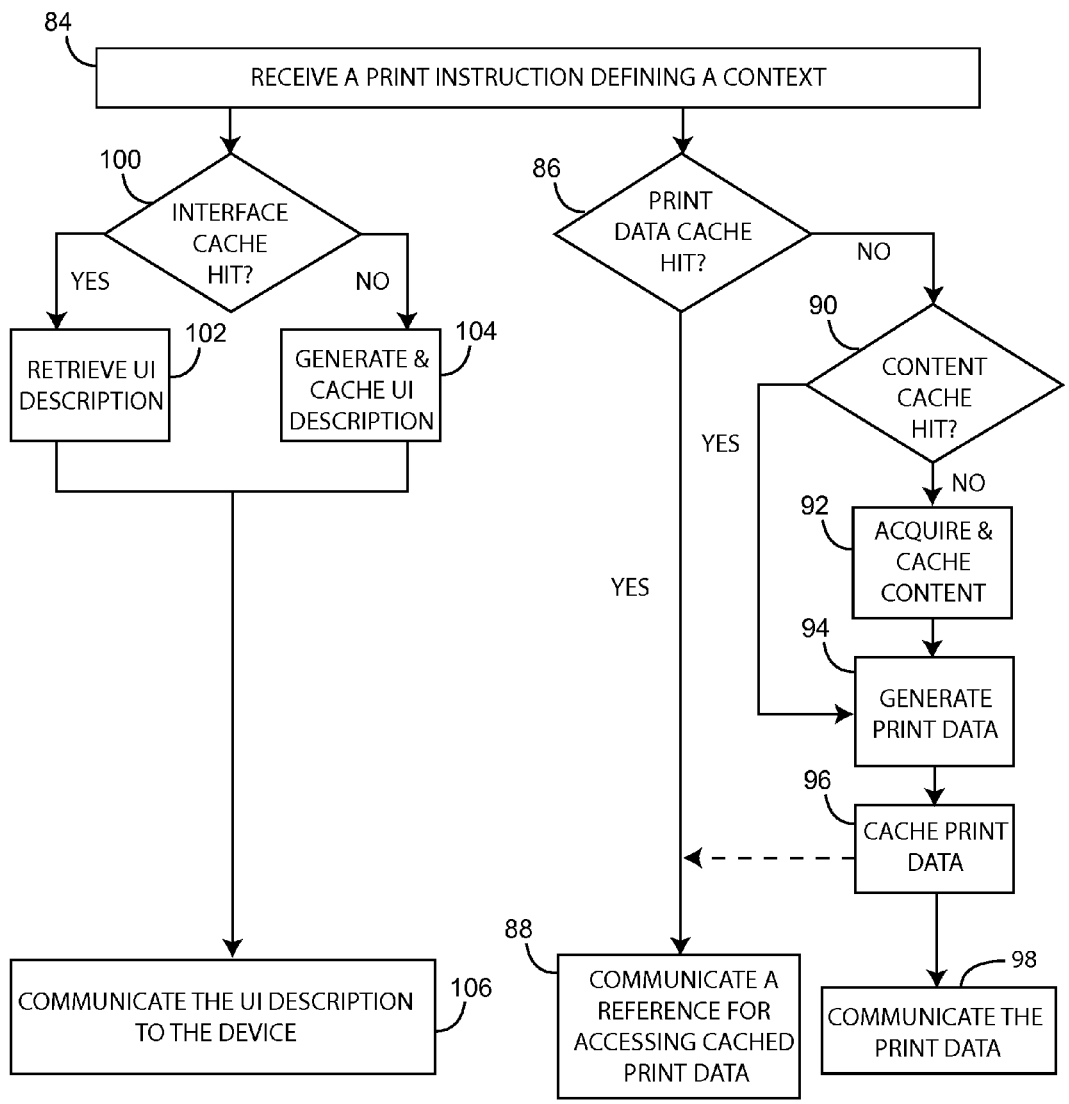

OPERATION: FIGS. 3-4 are exemplary flow diagrams of steps taken to implement various embodiments. In discussing FIGS. 3-4, reference may be made to component of FIGS. 1-2 to provide contextual examples. Implementation, however, is not limited to those examples. FIG. 3 is taken from the perspective of application service 18b and job service 18c. In particular the steps depicted above broken line (A) in FIG. 3 correspond to application service 18a, while the steps below broken line (A) correspond to job service 18c. FIG. 4 is taken from the perspective of application service 18b.

Starting with FIG. 3, a print instruction defining a context is received (step 52). Referring to FIG. 2, application service 18b and in particular device interface 40 of a given application 39 may implement step 52. As described, the context identifies the content to be used to generate a print job to be delivered to the device making the request. Such content is referred to as context compatible content.

As described, once context compatible content is acquired, it is formatted to generate print data. Following receipt of the request in step 52, it is determined if print data corresponding to the context is available in a cache (step 54). Such print data is referred to as context compatible print data. If available, the process proceeds with step 56. If not, the process jumps to step 58. Referring to FIG. 2, job manager 44 is responsible for implementing step 54. In particular, job manager 44 can use the context to search for context compatible print data in print data cache 34. For example, job manager may, using the context, discern a reference for accessing context compatible print data from print data cache 34. Instead, job manager 44 may maintain an association table mapping a given context to print data within print data cache 34.

When, in step 54, it is determined that context compatible print data exists in the cache, a reference for accessing the context compatible print data is communicated (step 56). Referring to FIG. 2, job manager 44 may implement step 56 by communicating the reference to job service 18*c*.

If the determination of step 54 reveals that the context compatible print data is not available in the cache, the context is used to acquire content for use in generating such print data (step 58). Print data is then generated from the acquired content (step 60). Such acquired content is referred to as context compatible content while such generated print data is referred to as context compatible print data. The print data generated in step 60 is then cached for subsequent reuse (step 62) and communicated (step 64). Rather than communicating the print data itself, the process may skip over to step 56 where a reference for accessing the cached print data is communicated. Referring to FIG. 2, acquisition manager 42 is responsible for step 58 which job manager 44 is responsible for steps 60, 62, and 64.

As noted, the preceding steps, above broken line (A), are taken from the perspective of application service 18*b*. The following steps, below broken line (A), are taken from the perspective of job service 18*c*. Step 66-72 follow the communication of print data in step 64. Steps, 74-80 follow the communication of the reference in step 56. Assuming that the print data is communicated in step 64, the print data is received (step 66) and rendered into a print job (step 68). The rendered print job is cached (step 70) and spooled (step 72). Referring to FIG. 2, job renderer 46 is responsible for steps 66, 68, and 70, while job spooler 48 implements step 72. In particular, job renderer 46 generates the print job placing a copy in print job cache 36 that can be later accessed and reused using the context of the request received in step 52. Job spooler 48 is queues the print job so that the print job can be communicated to or on behalf of the device that originated the request received in step 52.

Assuming that the reference is communicated in step 56, the reference is received (step 74). It is determined if a context compatible print job is available in the cache (step 76). Upon a positive determination, the cached print job is retrieved (step 78) and spooled (step 72). Upon a negative determination, the reference received in step 74 is used to retrieve the context compatible print data from the cache (step 80). The retrieved print data is rendered into a print job (step 68). The rendered print job is cached (step 70) and spooled (step 72). Referring to FIG. 2, job renderer is responsible for implementing steps 74, 76, 78, and 80.

Moving to FIG. 4, a print instruction defining a context is received (step 84). Referring to FIG. 2, application service 18*b* and in particular device interface 40 of a given application 39 may implement step 84. As described, the context identifies the content to be used to generate a print job to be delivered to the device making the request. Such content is referred to as context compatible content.

Following step 84, the process splits into two threads. The first thread includes steps 86-98. The second thread includes steps 100-106. Starting with the first thread, it is determined if print data corresponding to the context is available in a cache (step 86). Such print data is referred to as context compatible print data. Upon a positive determination in step 86, a reference for accessing the cached print data is communicated (step 88). Otherwise, the process jumps to step 90. Referring to FIG. 2, job manager 44 is responsible for steps 86 and 88. In particular, job manager 44 can use the context defined by the print request received in step 84 to examine print data cache 34 for context compatible print data. Instead, print manager 44 may maintain an association table mapping the context to print data in print data cache 34. Assuming the context compatible print data is available, print manager 44 communicates a reference for accessing the print data from print data cache 34.

Following a negative determination in step 86, it is determined if content associated with the context is available in the cache (step 90). Such content is referred to as context compatible content. If not available, content associated with the context is acquired and cached (step 92). Referring to FIG. 2, acquisition manger 42 is responsible for steps 90 and 92. In particular, acquisition manager 42 can utilize the context defined by the request received in step 84 to search for corresponding content in content cache 32. Instead, acquisition manager 42 may maintain an association table mapping the context to content within content cache 32.

Print data is generated from the content retrieved from the cache (if available) or acquired in step 92 (step 94). Again, such print data is referred to as context compatible print data. The context compatible print data is cached (step 96) so that it may be later accessed and reused using the context defined in the print request received in step 84. The context compatible print data is then communicated (step 98). Instead of communicating the print data, a reference for accessing the context compatible print data from the cache may be communicated (step 88). Referring to FIG. 2, job manager 44 is responsible for steps 94, 96, and 98. Job service 18*c* can then use the reference of the print data to communicate a context compatible print job to or on behalf of the device that originated the request received in step 84.

Moving to the second thread, a determination is made as to whether a user interface description associated with the context is available in the cache (step 100). Upon a positive determination, the associated user interface description is retrieved (step 102). Upon a negative determination, the user interface description is generated according to the context and cached for subsequent reuse (step 104). Whether retrieved or generated, such a user interface description is referred to as a context compatible user interface description. The context compatible user interface description is then communicated to the device that originated the request received in step 84 (step 106).

Referring to FIG. 2, device interface 40 is responsible for steps 100-106. Device interface 42 may use the context defined by the request received in step 82 to search interface cache 38 for a corresponding user interface description. Instead, device interface 40 may maintain an association table mapping the context to a user interface description within interface cache 38. When caching a generated user interface description in step 104, device interface 42 associates the cached user interface description with the context defined by the request received in step 84. Communicating the user interface description in step 106 serves to cause the device to display a user interface defined by the user interface description. Thorough that user interface, a user issue a subsequent print request.

CONCLUSION: The diagrams of FIGS. 1-2 show the architecture, functionality, and operation of various embodiments. Various components illustrated in FIGS. 1-2 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 3-4 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A system, comprising an application service and a job service, wherein:
    the application service is configured to receive, from a printing device via a network, a print instruction defining a context, communicate a reference to the job service for accessing print data compatible with the defined context if the print data is available in a cache, and to otherwise acquire content compatible with the defined context, format the acquired content to generate print data compatible with the defined context, and communicate the generated print data to the job service;
    the job service is configured to render a print job from print data communicated by the application service or acquired using the reference, and to cause the printing device to produce printed output using the print job rendered from the print data.

2. The system of claim 1, wherein the print instruction includes state data defining one or more of a current navigational state of the printing device, capabilities of the printing device, and a user configuration of the printing device, wherein the state data defines the context.

3. The system of claim 1, wherein the application service is configured to cache the generated print data so that it may be later retrieved by the job service from the cache using the reference.

4. The system of claim 1, wherein the job service includes a job renderer and a messenger, wherein:
    the job renderer is configured to determine if the print job is available from the cache and, if the print job is not available, to render the print job from print data acquired using the reference and caching the print job; and
    the messenger is configured to cause the printing device to produce the printed output using the print job, retrieving the print job from the cache if available.

5. The system of claim 1, wherein the application service is configured to acquire content by retrieving content associated with the defined context from the cache and otherwise using the context to retrieve the content from a content provider.

6. The system of claim 1, wherein the application service is configured to retrieve, if available, a user interface description associated with the context from the cache and to otherwise assemble the user interface description according to the context, the application service being further configured to return the user interface description to the printing device via the network.

7. The system of claim 1, wherein the application service is further configured to:
    receive, from a second printing device, a second print instruction associated with the defined context; and
    in response to the received second print instruction, communicate the reference to the job service for accessing the generated print data from the cache.

8. A method, comprising:
    receiving, from a printing device via a network, a print instruction defining a context,
    determining whether context compatible print data for the print instruction is available in a cache;
    in response to a determination that the context compatible print data is available in the cache:
        identifying a reference for accessing the cached context compatible print data and
        causing the printing device to produce a first printed output using a first print job rendered from print data retrieved using the reference; and
    in response to a determination that the context compatible print data is not available in the cache:
        acquiring content compatible with the defined context,
        formatting the acquired content to generate print data compatible with the defined context, and
        causing the printing device to produce a second printed output using a second print job rendered from the generated print data.

9. The method of claim 8, wherein the print instruction includes state data defining the context, the state data defining one or more of a current navigational state of the printing device, capabilities of the printing device, and a user configuration of the printing device, wherein the state data defines the context.

10. The method of claim 8, further comprising caching the generated print data so that it may be later retrieved from the cache using the reference.

11. The method of claim 10, further comprising:
    receiving, from a second printing device via the network, a second print instruction associated with the context;
    in response to the second print instruction, retrieving the generated print data from the cache using the reference;
    rendering the generated print data retrieved from the cache to obtain a third print job;
    communicating, via the network, the third print job to the second printing device to produce a third printed output job.

12. The method of claim 9, wherein causing the printing device to produce the first printed output comprises:
    determining whether the first print job is available from the cache;
    in response to a determination that the first print job is available in the cache, communicating the first print job retrieved from the cache to the printing device; and in response to a determination that the first print job is not available in the cache, rendering the first print job from the print data retrieved using the reference, caching the rendered first print job, and communicating the rendered first print job to the printing device via the network.

13. The method of claim 9, wherein acquiring content compatible with the defined context comprises retrieving, if available, content associated with the defined context from the cache, and otherwise using the defined context to retrieve the content from a content provider.

14. The method of claim 9, comprising returning, following receipt of the print instruction, communicating a context compatible user interface description to the printing device, the user interface description being retrieved, if available, from the cache using the defined context and otherwise generated according to the defined context.

15. An application service comprising a device interface manager, an acquisition manager, and a job manager, wherein:
the device interface is configured to receive, from a printing device via a network, a print instruction defining a context;
the acquisition manager is configured to use the context to acquire content compatible with the defined context when print data formatted from that content is not available in a cache;
the job manager is configured to communicate a reference to a job service for accessing print data compatible with the defined context if that print data is available in the cache, and to otherwise format the content acquired by the acquisition manager to generate print data compatible with the defined context, and communicate, to a job service, the generated print data to be rendered into a print job for the printing device.

16. The application service of claim 15, wherein the print instruction includes state data defining one or more of a current navigational state of the printing device, capabilities of the printing device, and a user configuration of the printing device, wherein the state data defines the context.

17. The application service of Claim 15, wherein the job manager is configured to cache the generated print data so that it may be later retrieved by the job service from the cache using the reference.

18. The application service of claim 17, wherein:
the device interface is further configured to receive, from a second printing device, a second print instruction associated with the defined context; and
the job manager is further configured to, in response to the received second print instruction, communicate the reference to the job service for retrieving the generated print data from the cache.

19. The application service of claim 15, wherein the acquisition manager is configured to acquire content by retrieving content associated with the defined context from the cache and otherwise using the defined context to retrieve the content from a content provider.

20. The application service of claim 15, wherein the device interface is configured to retrieve, if available, a user interface description associated with the context and otherwise assemble the user interface description according to the context, the device interface being configured to return the user interface description to the printing device via the network.

* * * * *

UNITED STATES PATENT AND TRADEMARK OFFICE
CERTIFICATE OF CORRECTION

PATENT NO. : 9,047,030 B2
APPLICATION NO. : 12/770110
DATED : June 2, 2015
INVENTOR(S) : Venugopal Kumarahalli Srinivasmurthy et al.

It is certified that error appears in the above-identified patent and that said Letters Patent is hereby corrected as shown below:

In the Claims:

In column 10, line 30, in Claim 8, delete "data and" and insert -- data, and --, therefor.

In column 12, line 8 approx., in Claim 17, delete "Claim" and insert -- claim --, therefor.

Signed and Sealed this
Fifteenth Day of March, 2016

Michelle K. Lee
*Director of the United States Patent and Trademark Office*